(12) United States Patent
Racape et al.

(10) Patent No.: US 11,956,436 B2
(45) Date of Patent: Apr. 9, 2024

(54) MULTIPLE REFERENCE INTRA PREDICTION USING VARIABLE WEIGHTS

(71) Applicant: INTERDIGITAL VC HOLDINGS, INC., Wilmington, DE (US)

(72) Inventors: Fabien Racape, San Francisco, CA (US); Gagan Rath, Bhubaneswar (IN); Fabrice Urban, Thorigne Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/253,672

(22) PCT Filed: Jun. 14, 2019

(86) PCT No.: PCT/US2019/037151
§ 371 (c)(1),
(2) Date: Dec. 18, 2020

(87) PCT Pub. No.: WO2020/005573
PCT Pub. Date: Jan. 2, 2020

(65) Prior Publication Data
US 2021/0266558 A1      Aug. 26, 2021

(30) Foreign Application Priority Data

Jun. 26, 2018 (EP) ..................... 18305809
Aug. 3, 2018 (EP) ..................... 18306061

(51) Int. Cl.
*H04N 19/134* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

2012/0147955 A1    6/2012  Budagavi
2017/0272757 A1*   9/2017  Xu .................... H04N 19/46
(Continued)

FOREIGN PATENT DOCUMENTS

CN      108141608       6/2018
EP      3217663         9/2017
(Continued)

OTHER PUBLICATIONS

Chang et al., Arbitrary Reference Tier for Intra Directional Modes, JVET of ITU-T SG 16 WP3 and ISO/IEC JTC 1/SC 29/WG 11, 3rd Meeting, Geneva, CH, May 26-Jun. 1, 2016, Document: JVET-C0043.

(Continued)

*Primary Examiner* — Christopher G Findley
(74) *Attorney, Agent, or Firm* — Ronald Kolczynski

(57) ABSTRACT

A method of performing intra prediction for encoding or decoding uses multiple layers of reference samples. The layers are formed into reference arrays that are used by a function, such as a weighted combination, to form a final prediction. The weights can be variable, chosen from among a number of number of sets of weights. The prediction is used in encoding or decoding a block of video data. The weights can be determined in a number of ways, and for a given prediction mode, the same weights, or different weights can be used for all pixels in a target block. If the (Continued)

weights are varied, they can depend on the distance of the target pixel from reference arrays. An index can be sent indicating which set of weights is to be used.

20 Claims, 14 Drawing Sheets

(51) Int. Cl.
*H04N 19/132* (2014.01)
*H04N 19/159* (2014.01)
*H04N 19/176* (2014.01)

(56) References Cited

U.S. PATENT DOCUMENTS

| | | | |
|---|---|---|---|
| 2017/0347103 A1 | 11/2017 | Yu et al. | |
| 2017/0359595 A1* | 12/2017 | Zhang | H04N 19/176 |
| 2018/0048889 A1 | 2/2018 | Zhang et al. | |
| 2018/0160113 A1* | 6/2018 | Jeong | H04N 19/176 |

FOREIGN PATENT DOCUMENTS

| | | |
|---|---|---|
| JP | 2013141187 | 7/2013 |
| WO | 2017205701 | 11/2017 |
| WO | WO2017190288 | 11/2017 |
| WO | WO2018047995 | 3/2018 |
| WO | WO2018070790 | 4/2018 |
| WO | WO2018070896 | 4/2018 |
| WO | WO2018106047 | 6/2018 |
| WO | 2019009540 | 1/2019 |

OTHER PUBLICATIONS

Van Der Auwera, et al., CE3: Summary Report on Intra Prediction and Mode Coding, Joint Video Experts Team (JVET) of ITU-T SG WP 3 and ISO/IEC JTC 1/SC 29/WG 11 11th Meeting: Ljubljana, SI, Jul. 10-18, 2018, Document: JVET-K0023-v3.

Li et al., "Multiple Line-Based Intra Predication", Document: JVET-C0071, pp. 1-6, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

Van Der Auwera, "Description of Core Experiment 3: Intra Prediction and Mode Coding", Joint Video Experts Team (JVET) of ITU-T SG 16 WP 3 and ISO/IEC JTC 1/SC 29/WG 11, Document JVET-J1023_r2, 10th Meeting: San Diego, California, USA, Apr. 10, 2018, 49 pages.

Anonymous, "High Efficiency Video Coding", International Telecommunications Union (ITU), Series H: Audiovisual and Multimedia Systems Infrastructure of audiovisual services—Coding of moving video, Recommendation ITU-T H.265, Oct. 2014, 540 pages.

Matsuo et al., A Study on Enhancement of HEVC Intra Prediction Using Weight Function, FIT2013, the 12th Forum on Information Technology, Proceedings, vol. 3, Peer-reviewed Papers and General Papers, Image Recognition and Media Understanding, Graphics and Images, Human Communication & Interaction, Educational Technology, Welfare Engineering and Multimedia Application, Information Processing Society of Japan, Institute of Electronics, Information and Communication Engineers, Aug. 20, 2013, pp. 7-1.

* cited by examiner

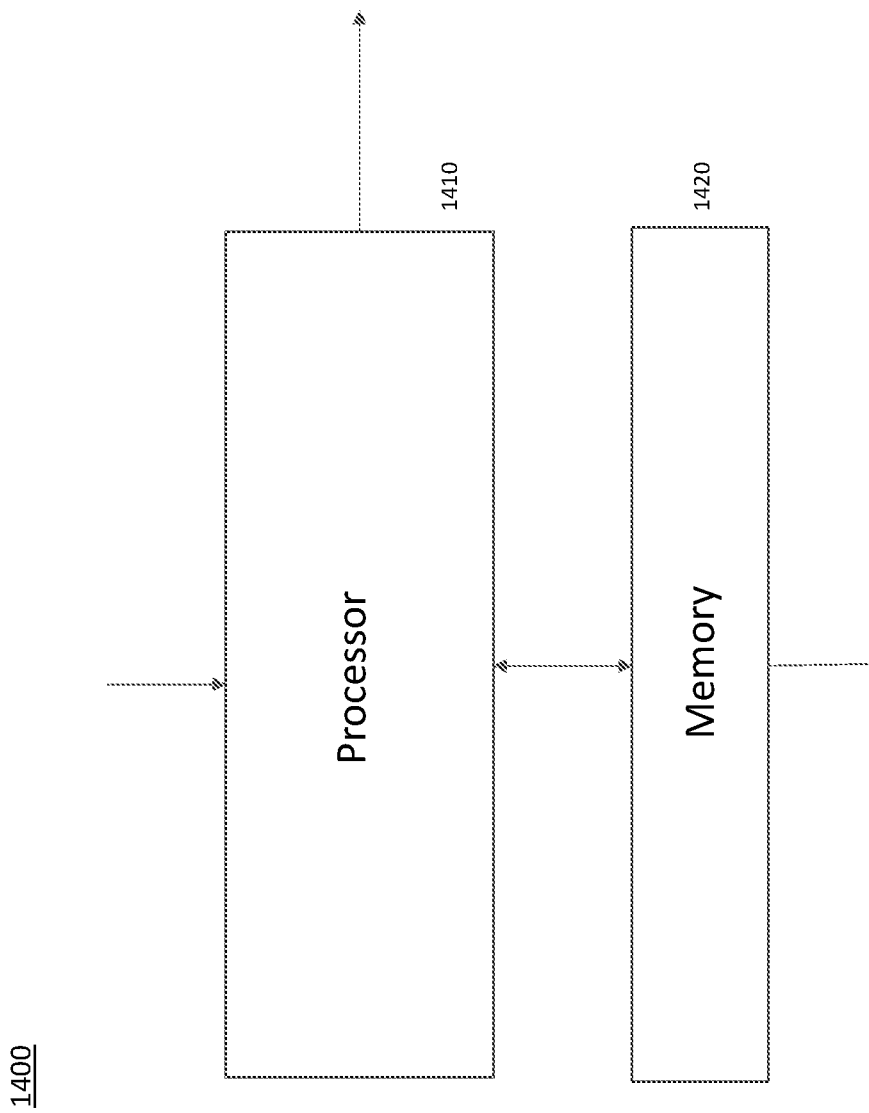

MULTIPLE REFERENCE INTRA PREDICTION USING VARIABLE WEIGHTS

TECHNICAL FIELD

At least one of the present embodiments generally relates to a method or an apparatus for video encoding or decoding, and more particularly, to a method or an apparatus for using multiple reference intra prediction with variable weights for a video encoder or a video decoder.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

The drawbacks and disadvantages of the prior art are addressed by the general aspects described herein, which are directed to block shape adaptive intra prediction directions in encoding and decoding.

According to a first aspect, there is provided a method. The method comprises steps for forming a plurality of reference arrays from reconstructed samples neighboring a block of video data, wherein said reconstructed samples are located at pixel positions equal to or greater than one position from said block of video data; predicting a target pixel of the block of video data respectively by applying a set of weights, chosen from a plurality of sets of weights, to one or more of the plurality of reference arrays; computing a final intra prediction for the target pixel of the block of video as a function of predictions respectively from one or more of the weighted reference arrays; and, encoding the block of video using the prediction.

According to another aspect, there is provided a second method. The method comprises steps for forming a plurality of reference arrays from reconstructed samples neighboring a block of video data, wherein said reconstructed samples are located at pixel positions equal to or greater than one position from said block of video data; predicting a target pixel of the block of video data respectively by applying a set of weights, chosen from a plurality of sets of weights, to one or more of the plurality of reference arrays; computing a final intra prediction for the target pixel of the block of video as a function of predictions respectively from one or more of the weighted reference arrays; and, decoding the block of video using the prediction.

According to another aspect, there is provided an apparatus. The apparatus comprises a processor. The processor can be configured to encode a block of a video or decode a bitstream by executing either of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 4(a) shows the prediction direction is extended to obtain a predictor on a second reference array lying between two reference samples for a target pixel. FIG. 4(b) shows a second predictor lying directly on a reference sample.

FIG. 14 shows an embodiment of an apparatus for encoding or decoding using multiple reference intra prediction using variable weights.

DETAILED DESCRIPTION

The general aspects described herein involve the domain of image and video compression and focus on spatial prediction. Classical codecs partition frames into non-overlapping large square blocks, e.g. Coding Tree Units (CTU) in H.265/HEVC (High Efficiency Video Coding, ITU-T H.265 Telecommunication Standardization Sector of ITU, "Series H: Audiovisual and Multimedia Systems, Infrastructure of audiovisual services—Coding of moving video, High efficiency video coding." October-2014.) or Super Blocks in VP9 ("AV1 Bitstream & Decoding Process Specification." The Alliance for Open Media). They are called CTUs in the following. These blocks are then split into smaller blocks or Coding units (CU) following a recursive tree. In HEVC and AV1, the maximum size of blocks is set to 64×64. This size is likely to increase to at least 128×128 in the next standard H.266/VVC (Versatile Video Coding) under study by the Joint Video Expert Team (JVET).

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In a recent work, the use of multiple reference lines was introduced. A weighted combination of samples from multiple lines along a given prediction direction was calculated to be then padded onto the current block.

In aspects described herein, this method is extended to allow the encoder to select different sets of weights to be applied to the considered lines. The chosen set is then transmitted per block to the decoder.

One problem solved by the described aspects is how to efficiently predict a block using its previously reconstructed neighborhood.

Figure 1:
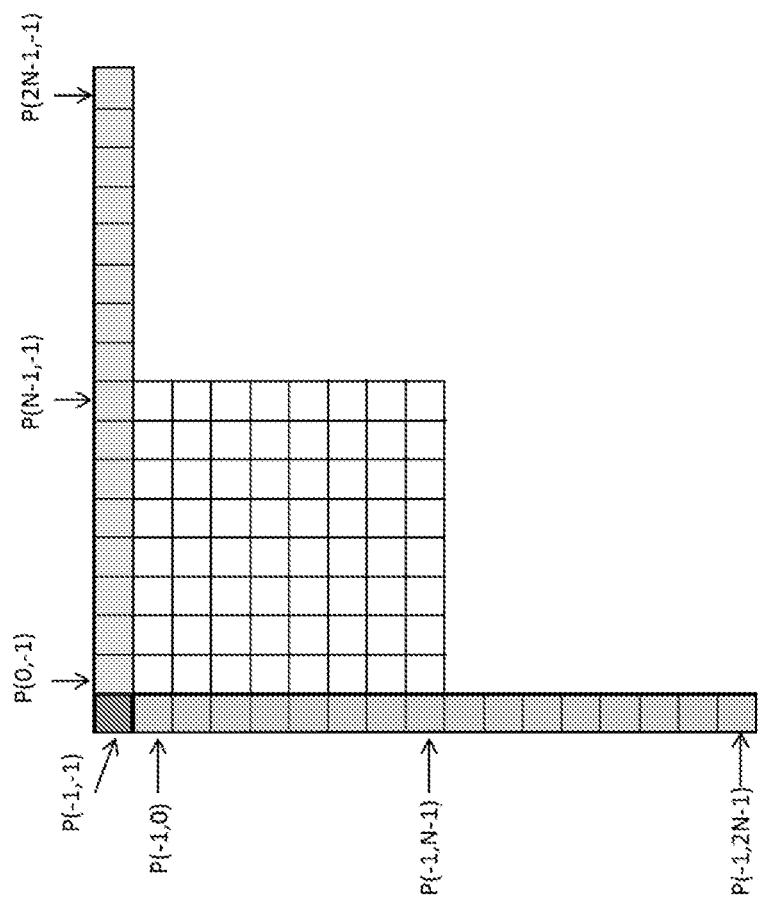
FIG. 1 shows reference samples for intra prediction in HEVC and pixel values at coordinates indicated by P(x,y).

First, intra prediction as performed in the state-of-the-art standard H.265/HEVC is described. The intra prediction process in HEVC consists of three steps: (1) reference sample generation (2) intra sample prediction and (3) post-processing of predicted samples. The reference sample generation process is illustrated in FIG. 1. For a prediction unit (PU) of size N×N, a row of 2N decoded samples on the top is formed from the previously reconstructed top and top right pixels to the current PU. Similarly, a column of 2N samples on the left is formed from the reconstructed left and below left pixels. The corner pixel at the top-left position is also used to fill up the gap between the top row and the left column references. If some of the samples on top or left are not available, because of the corresponding CUs not being in the same slice, or the current CU being at a frame boundary, etc., then a method called reference sample substitution is performed where the missing samples are copied from the available samples in a clock-wise direction. Then, depending on the current CU size and the prediction mode, the reference samples are filtered using a specified filter.

Figure 2:
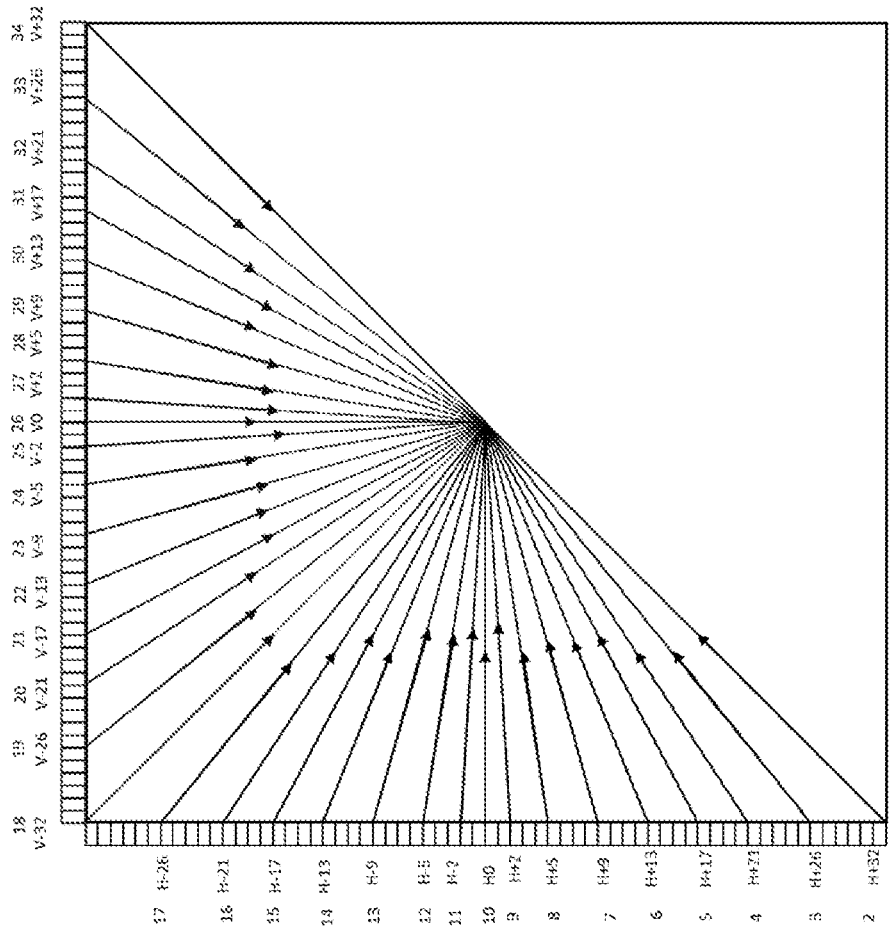
FIG. 2 shows intra prediction directions in HEVC.

The next step, i.e., the intra sample prediction, consists of predicting the pixels of the target CU based on the reference samples. As mentioned earlier, in order to predict different kinds of content efficiently, HEVC supports a range of prediction modes. Planar and DC prediction modes are used to predict smooth and gradually changing regions, whereas angular prediction modes are used to capture different directional structures. HEVC supports 33 directional prediction modes which are indexed from 2 to 34. These prediction modes correspond to different prediction directions as illustrated in FIG. 2.

Figure 3:
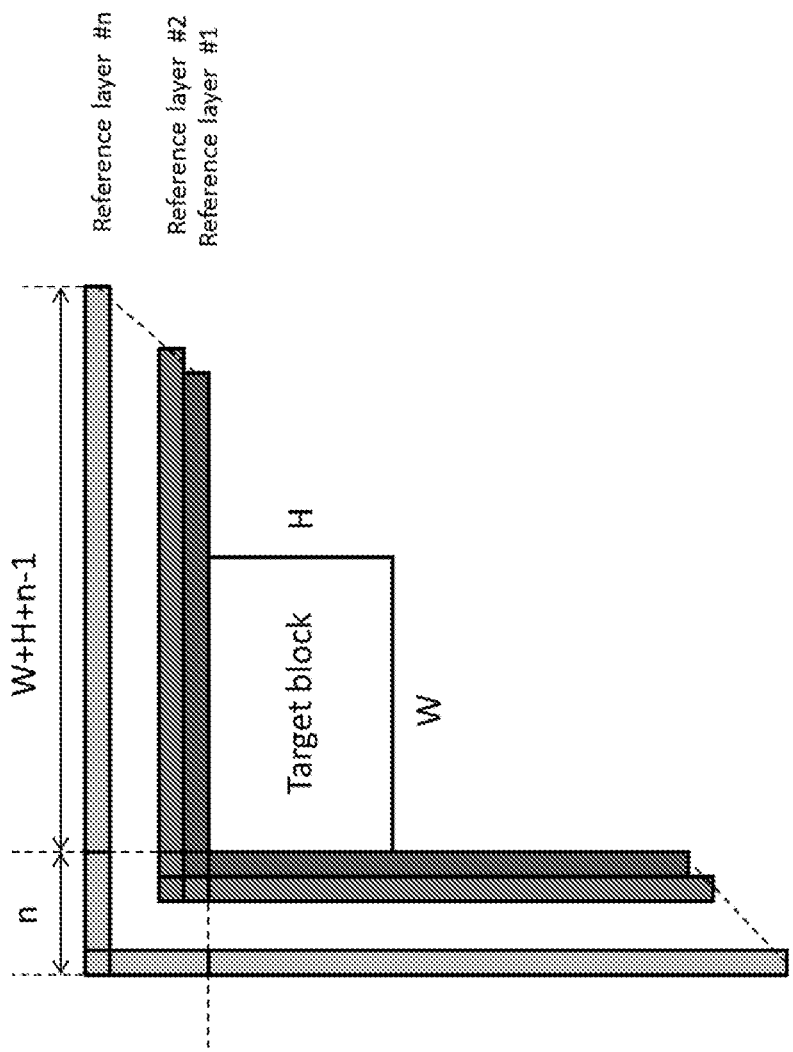
FIG. 3 shows an example of multi-reference intra prediction.

Multi-reference intra prediction refers to intra prediction using multiple rows and columns of reference pixels (FIG. 3). It is also called arbitrary tier reference intra prediction or multi-line intra prediction. In image processing, it is common to use first-order prediction models because of high correlation. The reason for using one row and column as references in intra-prediction was originally based on this, and on the fact that other decoded rows and columns are farther from the target block pixels, and they do not add much additional information about the target block. This is alright when the number of prediction directions was small (e.g., <=7) and the block size was also small (e.g., <=8) in earlier standards. However, in HEVC, the prediction unit size has been increased to 64×64 along with a corresponding increase in the number of angular prediction directions to 33. For future standards, block sizes up to 256×256 with number of angular prediction modes up to 129 are under study. Considering this, it makes sense to use additional rows and columns of decoded pixels for reference when the trade-off between the cost due to additional memory and complexity, and the coding gain is acceptable.

Figure 4:
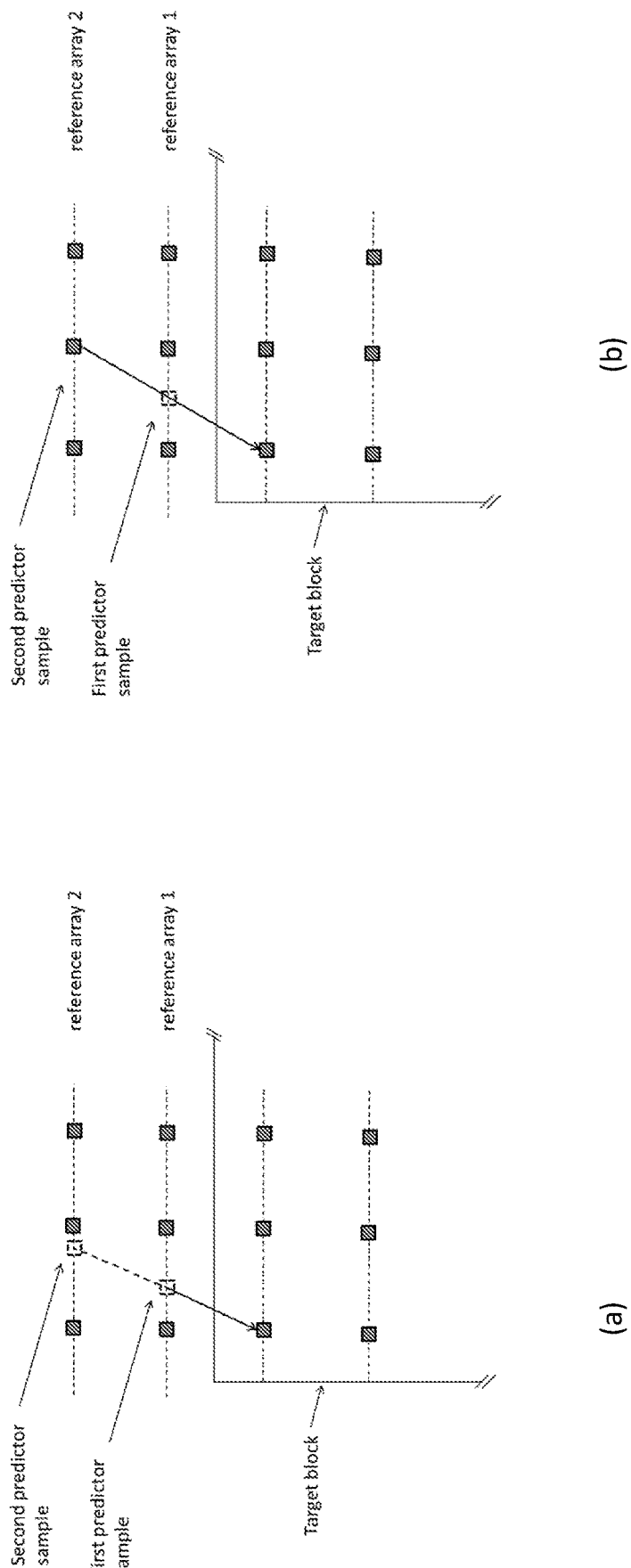
FIG. 4 shows intra prediction with two references.
Figure 5:
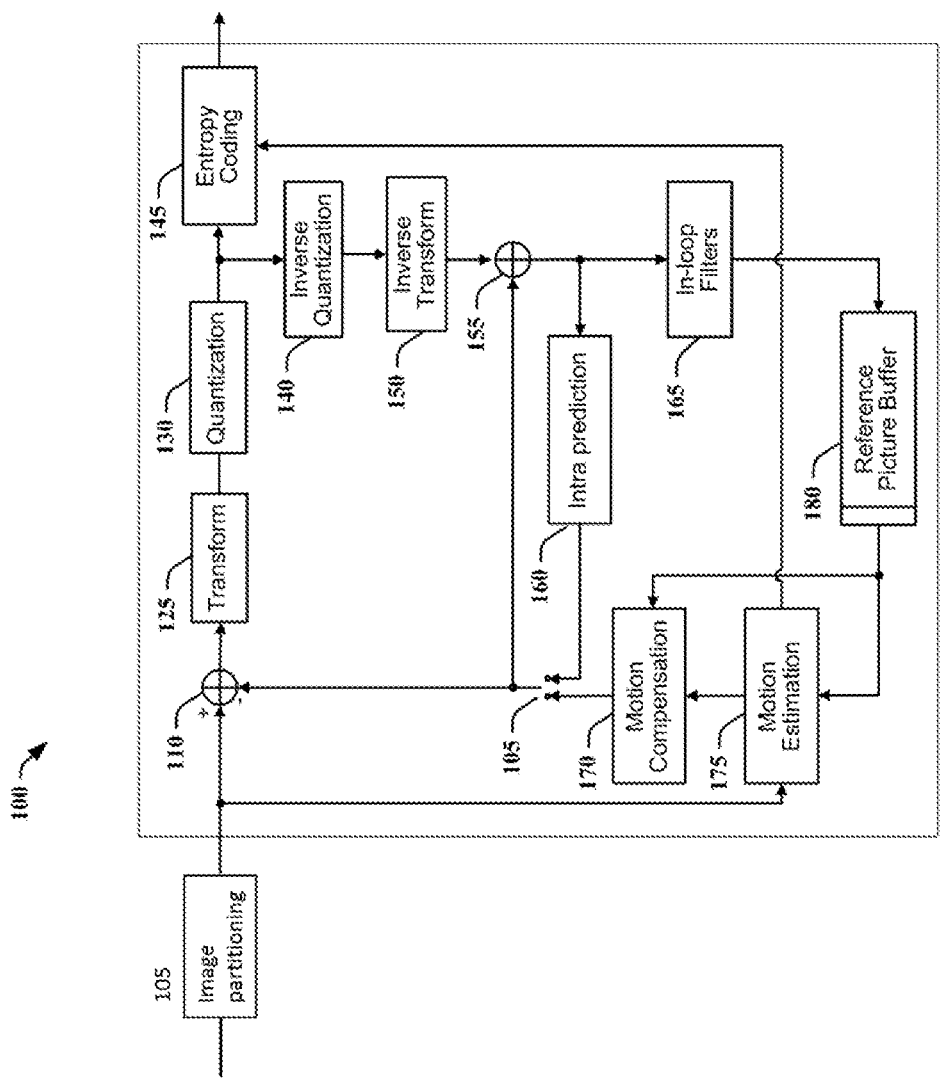
FIG. 5 shows a standard, generic, video compression scheme.
Figure 6:
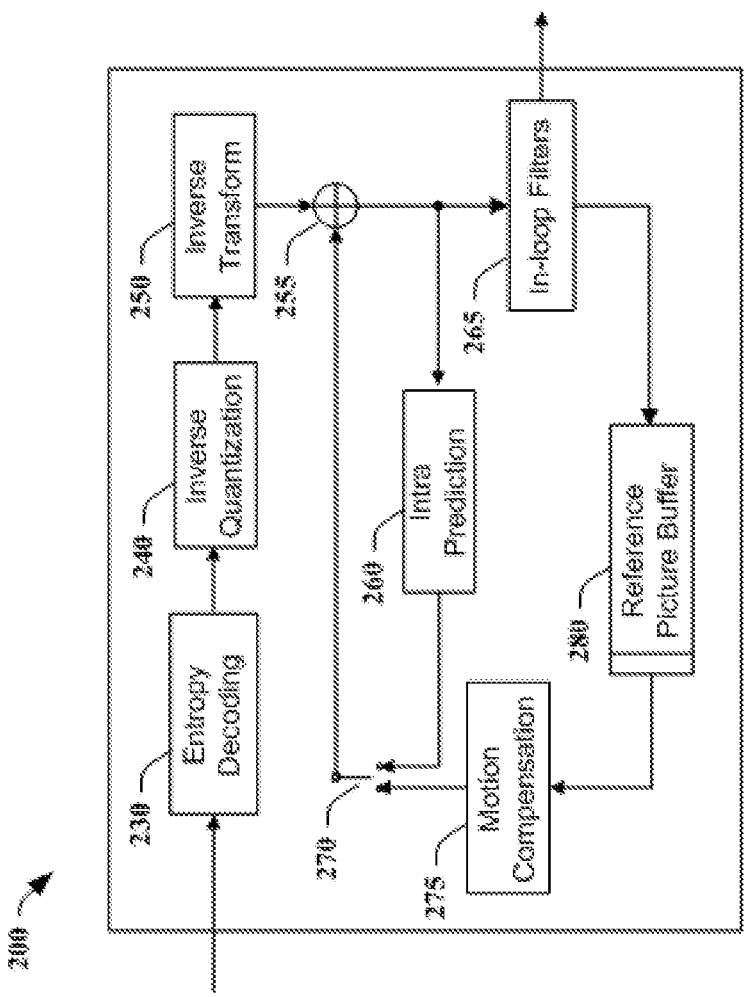
FIG. 6 shows a standard, generic, video decompression scheme.

Consider a vertical angular prediction mode when the predicting sample for a target pixel is in-between two reference samples on the top reference array (e.g., FIG. 4(a)). In this case, in HEVC, the predicting sample will be linearly interpolated, as mentioned in the previous section. The predicting sample is just an estimate. If we extend the prediction direction by one more row, the line will cross the second row at a different point. Even though the second row of pixels is slightly farther than the first row, because of the directionality of object structures in an image, the estimate of the second row can be a better estimate than the first one. In some cases, it can even intersect the second row exactly at the location of a decoded pixel (e.g., FIG. 4(b)). Based on this idea, it makes sense to predict the target block based on multiple references.

For referring to the different reference row/column pairs, the term "reference layer" will be used. Thus, reference layer 1 will mean the reference row and column next to the target block (i.e., the usual references in HEVC), reference layer 2 will mean the reference row and column next to the reference layer 1, and so on.

For making the prediction, form top and left reference arrays corresponding to a reference layer, as mentioned in the previous section. They will be referred to as reference array 1, reference array 2, and so on. Note that reference array n, n=1, 2, . . . can mean either the top reference array, or the left reference array, depending on if the prediction mode corresponds to a vertical or horizontal direction, respectively.

In earlier work, the reference samples for each layer follow the reference sample generation algorithm in HEVC or JEM. Then reference arrays are formed using those samples. For the modes with a positive angle (modes 2 to 10 and 26 to 34 in HEVC), the reference array of #n is simply the top reference samples of reference layer #n:

$$Ref_n[x]=P[x-n][-n], 0 \leq x \leq W+H+2n-2, n=1,2,3, \ldots$$

Then, the prediction for the target pixel at (x, y) is computed as $$P[x][y] = \frac{w_1 * P_1[x][y] + w_2 * P_2[x][y] + \ldots + w_n * P_N[x][y]}{w_1 + w_2 + \ldots + w_N},$$

where $w_1, w_2, \ldots, w_N$ are weights known to both the encoder and the decoder. N here represents the number of reference layers used for the intra prediction. For convenience of implementation, the weights are normalized such that $$w_1+w_2+\ldots+w_N=2^K$$

for some positive integer K.

In this method, the weights are chosen and fixed for all the blocks of the sequence, which is one problem addressed by the aspects described herein.

In the aspects described herein, the multi reference intra prediction scheme proposed in earlier work is extended by letting the encoder choose the best configuration among different sets of weights to be applied to the different lines of reference samples for intra prediction. The chosen weights, i.e. their index in the list of possible choices, are then transmitted, per block, to the decoder.

As an example, using truncated unary coding, it is possible to transmit 2 bits to indicate a choice among 3 possible sets. The exemplary sets of weights {{1,0}, {3,1}, {1,1}} have been tested. For each of the 3 possible sets, the first number represents the weight applied to the closest line of reference samples, the second number corresponds to the weight that is applied to the second line of reference samples. However, the general aspects are not limited to the use of two lines of reference samples.

This exemplary configuration has been implemented and tested, the resulting bitrate savings over the test model VTM of JVET, in intra configuration on the first frame of each sequence of the JVET test set, are reported in Table 1. The impacted codec module is intra prediction block step 160 of FIG. 9 or step 260 of FIG. 10.

TABLE 1 resulting gains of the proposed tool over the test model VTM

| | Over VTM-1.0 | | | | |
|---|---|---|---|---|---|
| | Y | U | V | EncT | DecT |
| Class A1 | −0.74% | −0.37% | −0.84% | 190% | 104% |
| Class A2 | −0.92% | −1.71% | −1.23% | 183% | 105% |
| Class B | −0.77% | −1.63% | −1.33% | 172% | 107% |
| Class C | −0.35% | −0.62% | −0.94% | 163% | 109% |
| Class E | −1.16% | −2.08% | −1.96% | 141% | 106% |
| Overall | −0.76% | −1.28% | −1.25% | 169% | 106% |
| Class D | −0.26% | −1.40% | −1.47% | 127% | 104% |

The aspects described herein extend earlier work so that it is possible for the encoder to optimize the prediction using different sets of weights per block. In earlier work, the weights are fixed. The activation of the multi-reference intra prediction is done using a transmitted flag. However, under the aspects herein, several variants are described which differ in the way of coding the information related to the choice of the weights to be applied for each block.

Figure 7:
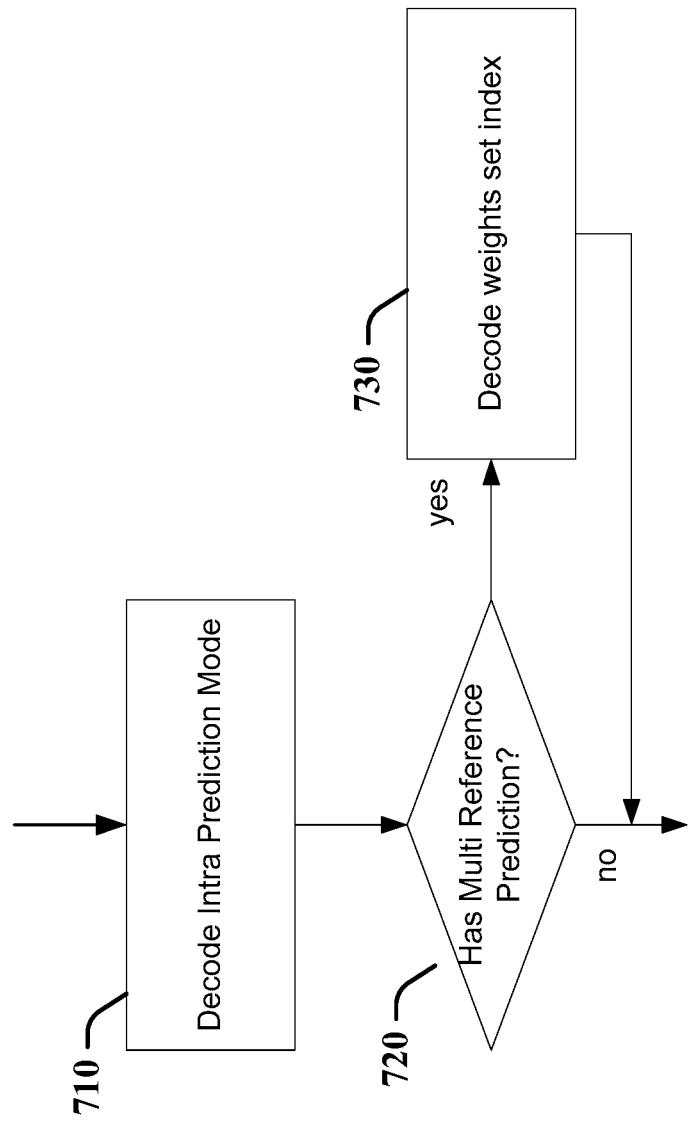
FIG. 7 shows an exemplary flow diagram for decoding (parsing) intra prediction information.

In FIG. 7, an example that corresponds to one of the main embodiments is described, where the coding of the weights depends on the intra mode. The use of multiple lines is more advantageous for directional intra mode than other modes like DC and Planar modes, for example. The first step 710 then consists in decoding the prediction mode. If the mode can be adapted to multi-reference prediction (720), the index of the set of weights is decoded (730). Otherwise, classical intra prediction is performed.

Figure 8:
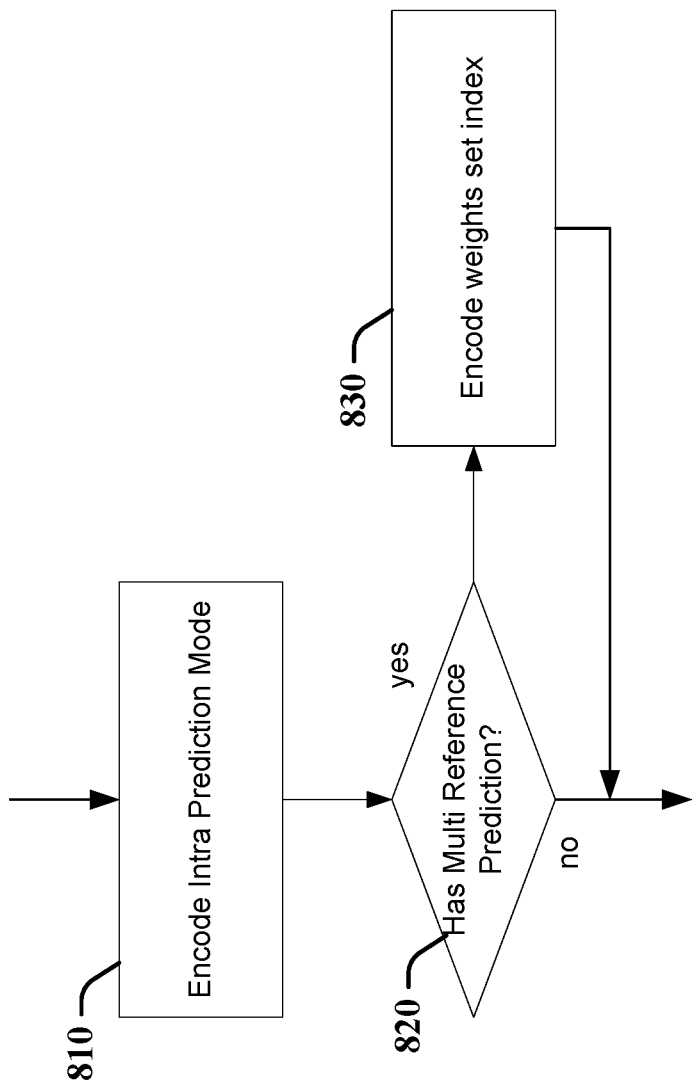
FIG. 8 shows an exemplary flow diagram for encoding intra prediction information.

A similar flowchart describes the process of coding the required transmitted index, which is shown in FIG. 8. The set of weights can be coded with any binary coding.

As an example, using truncated unary coding, it is possible to transmit 2 bits to indicate a choice among 3 possible sets. The exemplary sets of weights {{1,0}, {3,1}, {1,1}} have been tested, which give the results shown in Table 1, when applied to Luma blocks only. For each of the 3 possible sets, the first number represents the weight applied to the closest line of reference samples, the second number corresponds to the weight that is applied to the second line of reference samples. However, the aspects described are not limited to the use of two lines of reference samples. The final weights are normalized, i.e. divided by {1,4,2} respectively. In this example, the first pair of weights corresponds to the classical intra prediction.

At the encoder side, the basic idea would be to try all the different sets and choose the best weights, i.e. the solutions that provide the best rate/distortion (RD) cost using classical Rate Distortion Optimization (RDO). This requires encoding, for each intra mode, each version of prediction with the weights and compare the costs, resulting in an increase of the encoder runtime. Different solutions are described to reduce the overhead in terms of complexity.

First, classical encoders usually contain two passes for an intra prediction decision. A first (fast) pass selects a subset of best modes among the numerous intra modes (33 in HEVC), by estimating its rate/distortion (RD) cost, without performing the full encoding of the block. Then, the full RD calculation is performed on the selected modes to choose the best one.

It is then possible to perform the selection of the weights at a first pass and keep the pair {intra mode, index of weights} to be processed at a second pass. This reduces the encoding runtime while keeping a large part of the gains.

It is also possible to select the mode in the fast pass and add another fast pass which evaluates the best weights on the selected intra modes only. Again, this estimation does not rely on a full encoding of the block, but on an estimation of the cost of the residual.

In terms of syntax, several embodiments can be considered as described below.

Embodiment 1

Multi-reference intra prediction with variable weights is applied for directional intra modes only, or a set of directional modes. The decoding, or encoding, of intra prediction information is performed following the steps described in FIG. 7, or FIG. 8, respectively.

Embodiment 2

Multi-reference intra prediction with variable weights is applied for all the intra modes. In that case, there is no need to decode the intra mode, the index of the set of weights is parsed for each block. The decoding and encoding, of intra prediction information is performed following the steps described in FIG. 7, or FIG. 8, respectively.

Embodiment 3

Embodiment 1 or 2 where multi-reference prediction with variable weights is applied on the luma component only. This allows saving the coding of additional bits for the chroma components. The prediction process of the chroma block can be either the classical prediction using a single line of reference samples, or multi-reference samples with a fixed set of weights which does not vary over blocks.

Embodiment 4

Embodiment 1 or 2, where the prediction of chroma components follows the choice made for the luma. This requires that the partitioning of the chroma blocks follows the luma, or that a specific mapping is set, for example, using the center or top-left pixel of the chroma block and deriving its position in the luma partitions.

Embodiment 5

Embodiment 1 or 2, where the index is coded using unary truncated coding. Using the example of 3 sets of weights above {{1,0}, {3,1}, {1,1}}:
A first bin indicates if the first set {1,0} is selected (value 0). If the first bin is equal to 1, a second bin is parsed to select the second set {3,1} (value 0) or the third {1,1} (value 1).

Embodiment 6

Embodiment 1 or 2, where the multiple reference intra prediction is performed on big blocks only, e.g. blocks with height or width higher than a size, such as 16 samples, for example.

Embodiment 7

Embodiment 1 or 2, where the sets of weights, number of reference lines, depend on the prediction direction, or the block size/shape (square/rectangle . . . ), component ID, in addition to the transmitted index. It can use a predefined table (indexed by the prediction direction and block shape) to translate the index into the real set of weights.

Embodiment 8

Embodiment 1 or 3, where the sets of weights, number of reference lines, depend on the position of the predictor. This embodiment uses per-pixel dependent weights. The embodiment can use sub-set 1 if the predictor comes from top lines, and sub-set 2 if the predictor comes from left columns.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 9:
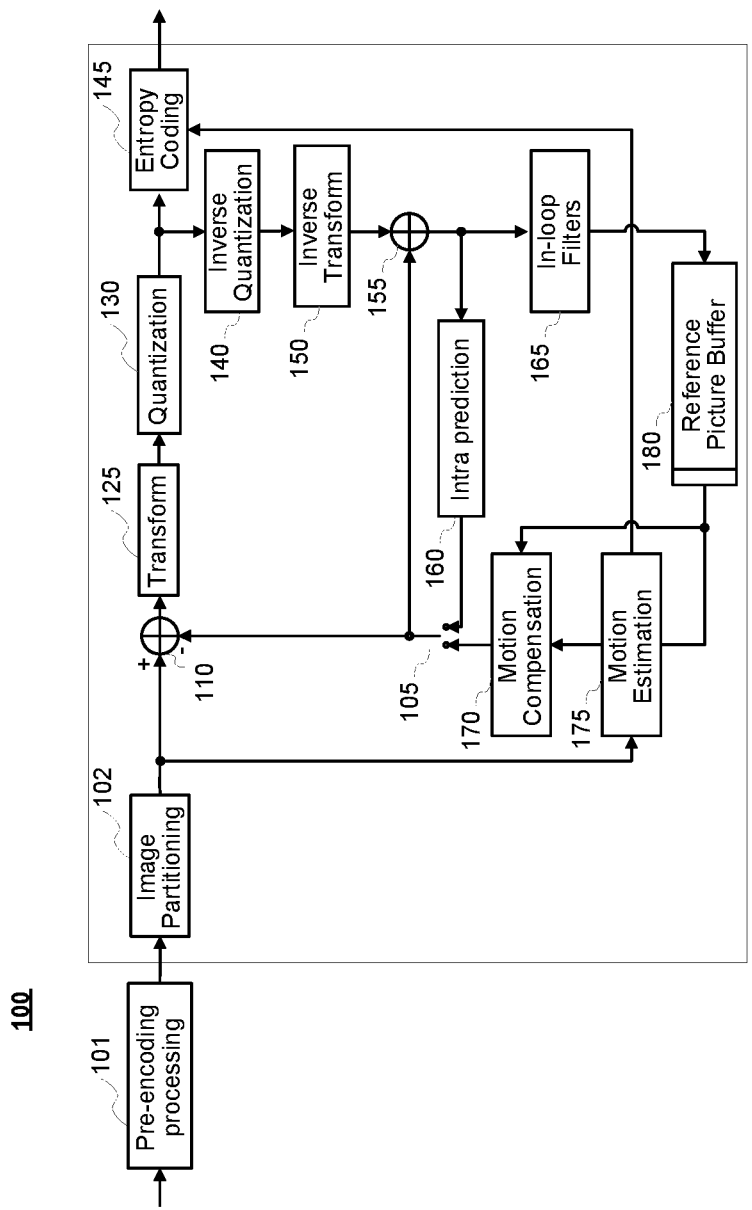
FIG. 9 shows an encoding scheme with pre-encoding processing and image partitioning sections.
Figure 10:
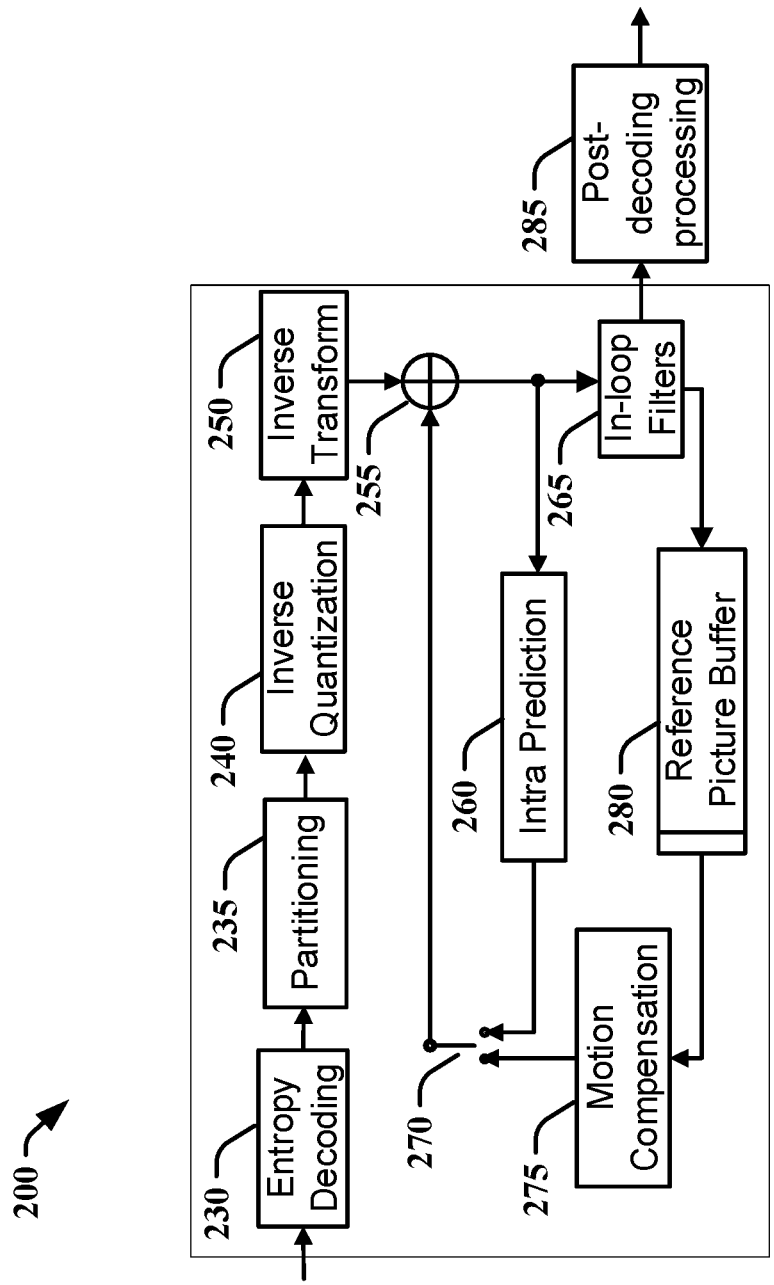
FIG. 10 shows a decoding scheme with post-decoding processing.
Figure 11:
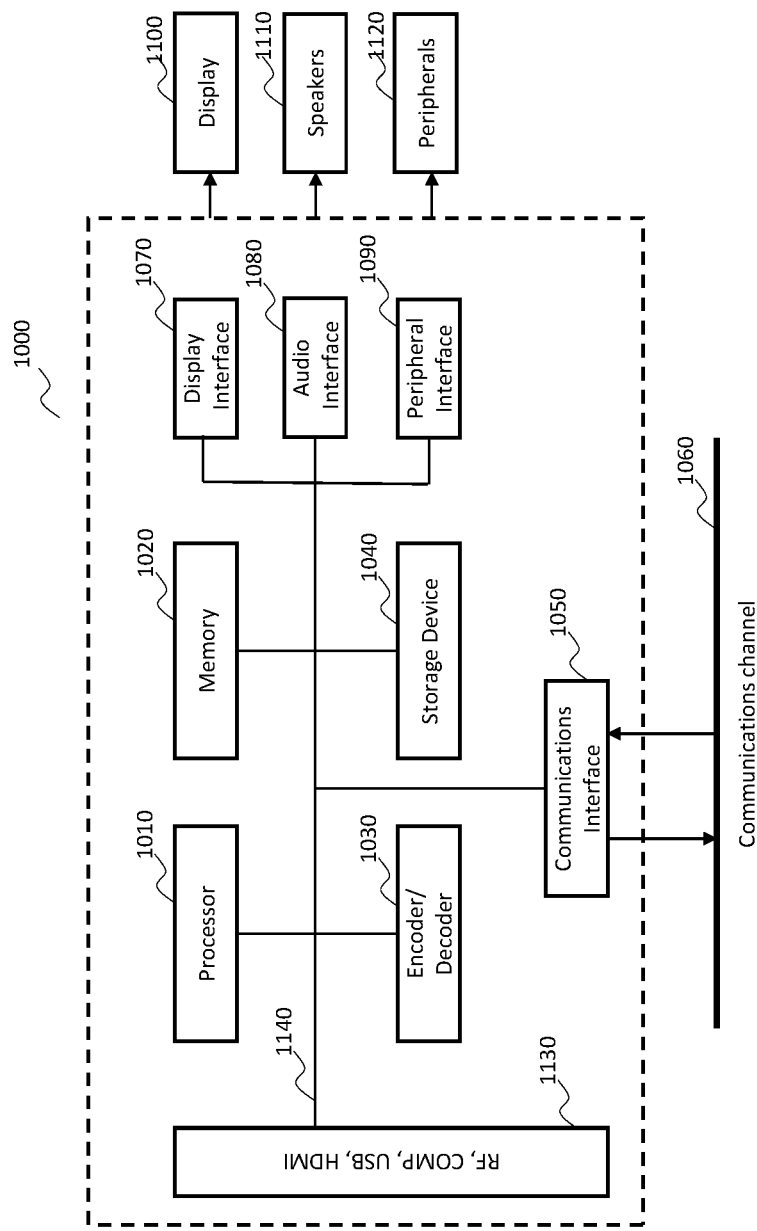
FIG. 11 shows a typical processor arrangement in which the described embodiments may be implemented.

The aspects described and contemplated in this document can be implemented in many different forms. FIGS. 9, 10 and 11 below provide some embodiments, but other embodiments are contemplated and the discussion of FIGS. 9, 10 and 11 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 9 and FIG. 10. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 9 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 10 illustrates a block diagram of a video decoder 200. In the decoder 200, a bitstream is decoded by the decoder elements as described below. Video decoder 200 generally performs a decoding pass reciprocal to the encoding pass as described in FIG. 9. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 11 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Modifying the intra prediction process applied in the decoder and/or encoder.

Enabling several weighted intra prediction methods in the decoder and/or encoder.

Inserting in the signaling syntax elements that enable the decoder to identify the weights to be applied to intra prediction references.

Selecting, based on these syntax elements, a weight or set of weights to apply at the decoder.

Applying the weighted intra prediction at the decoder.

Adapting residues at an encoder according to any of the embodiments discussed.

A bitstream or signal that includes one or more of the described syntax elements, or variations thereof.

Inserting in the signaling syntax elements that enable the decoder to adapt residues in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs weighting of intra prediction references according to any of the embodiments described.

A TV, set-top box, cell phone, tablet, or other electronic device that performs weighting of intra prediction references according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs weighting of intra prediction references according to any of the embodiments described.

A TV, set-top box, cell phone, tablet, or other electronic device that receives (e.g. using an antenna) a signal over the air that includes an encoded image, and performs weighting of intra prediction references according to any of the embodiments described.

Various other generalized, as well as particularized, inventions and claims are also supported and contemplated throughout this disclosure.

Figure 12:
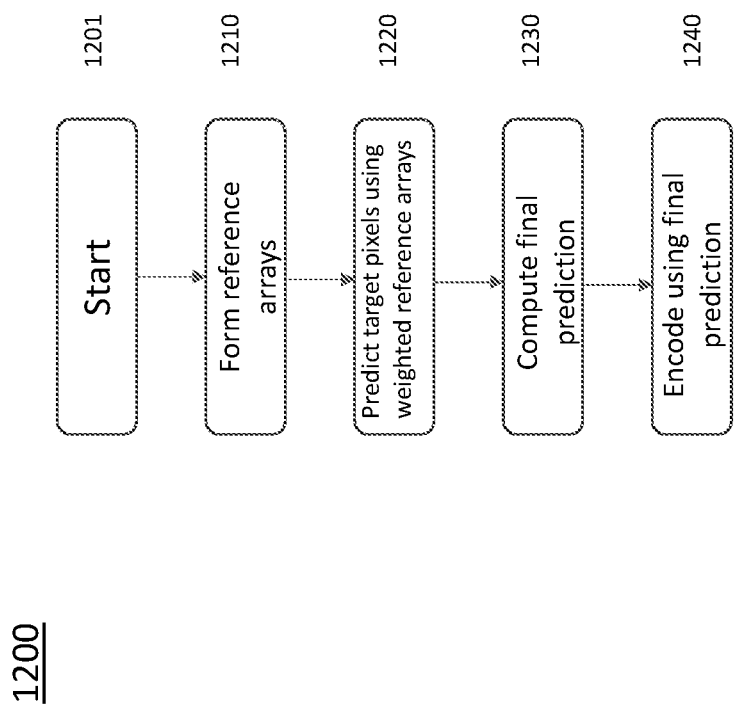
FIG. 12 shows an embodiment of a method for encoding using multiple reference intra prediction using variable weights.

One embodiment of a method 1200 for encoding a block of video data using the general aspects described here is shown in FIG. 12. The method commences at Start block 1201 and control proceeds to function block 1210 for forming a plurality of reference arrays from reconstructed samples neighboring a block of video data, wherein the reconstructed samples are located at pixel positions equal to or greater than one position from said block of video data. Control then proceeds from block 1210 to block 1220 for predicting a target pixel of the block of video data respectively by applying a set of weights, chosen from a plurality of sets of weights, to one or more of the plurality of reference arrays. Control proceeds from block 1220 to block 1230 for computing a final intra prediction for the target pixel of the block of video as a function of predictions respectively from one or more of the weighted reference arrays. Control then proceeds from block 1230 to block 1240 for encoding the block of video using the prediction.

Figure 13:
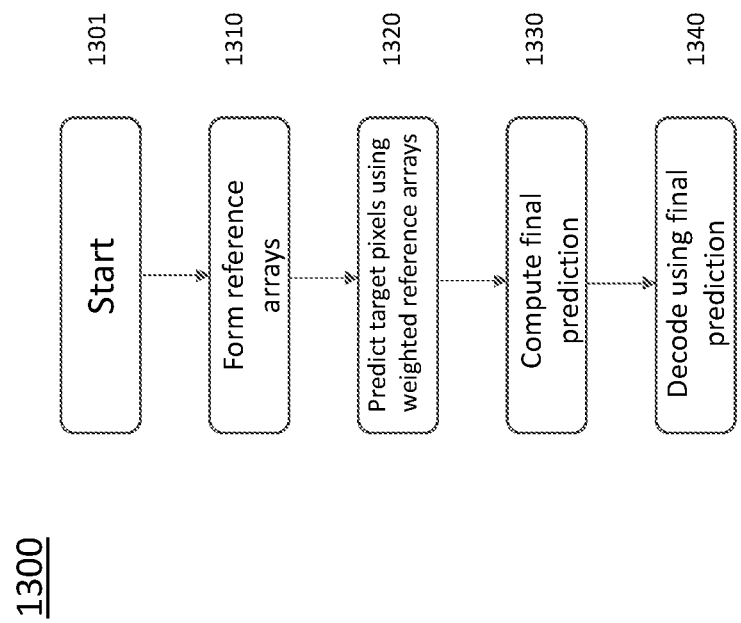
FIG. 13 shows an embodiment of another method for decoding using multiple reference intra prediction using variable weights.

One embodiment of a method 1300 for decoding a block of video data using the general aspects described here is shown in FIG. 13. The method commences at Start block 1301 and control proceeds to function block 1310 for forming a plurality of reference arrays from reconstructed samples neighboring a block of video data, wherein the reconstructed samples are located at pixel positions equal to or greater than one position from said block of video data. Control then proceeds from block 1310 to block 1320 for predicting a target pixel of the block of video data respectively by applying a set of weights, chosen from a plurality of sets of weights, to one or more of the plurality of reference arrays. Control proceeds from block 1320 to block 1330 for computing a final intra prediction for the target pixel of the block of video as a function of predictions respectively from one or more of the weighted reference arrays. Control then proceeds from block 1330 to block 1340 for decoding the block of video using the prediction.

FIG. 14 shows one embodiment of an apparatus 1400 for encoding or decoding a block of video data. The apparatus comprises Processor 1410 and can be interconnected to a memory 1420 through at least one port. Both Processor 1410 and memory 1420 can also have one or more additional interconnections to external connections.

Processor 1410 is configured to either encode or decode video data by forming a plurality of reference arrays from reconstructed samples of a block of video data, predicting a target pixel of the block of video data respectively by applying a set of weights, chosen from a plurality of sets of weights, to one or more of the plurality of reference arrays, computing a final prediction for the target pixel of the block of video as a function of predictions respectively from one or more of the reference arrays and, either encoding or decoding the block of video using the final prediction.

The invention claimed is:

1. A method, comprising:
    predicting a target pixel of a block of video data by applying weights to one or more of a plurality of reconstructed samples from one or more rows or columns neighboring the block of video data;
    computing at least one intra prediction for the target pixel of the luminance block of video data as a function of predictions from one or more of the weighted predictions; and, encoding the block of video using the prediction, wherein an index corresponding to a set of weights is assigned to sets of weights for applying said weights to a set of reference lines for all intra modes, and wherein sets of weights are assigned on a per block basis for luminance, and wherein chrominance uses a fixed set of weights for all blocks, and wherein reference lines used with a set of weights comprise reference lines not immediately adjacent to the block of video data.

2. The method of claim 1, wherein the index is coded using unary truncated coding.

3. The method of claim 1, wherein said weights are applied for luminance components only.

4. An apparatus, comprising:
a processor, configured to perform:
predicting a target pixel of a block of video data by applying weights to one or more of a plurality of reconstructed samples from one or more rows or columns neighboring the block of video data;
computing at least one intra prediction for the target pixel of the luminance block of video data as a function of predictions from one or more of the weighted predictions; and,
encoding the block of video using the prediction, wherein an index corresponding to a set of weights is assigned to sets of weights for applying said weights to a set of reference lines for all intra modes, and wherein sets of weights are assigned on a per block basis for luminance, and wherein chrominance uses a fixed set of weights for all blocks, and wherein reference lines used with a set of weights comprise reference lines not immediately adjacent to the block of video data.

5. The apparatus of claim 4, wherein multiple reference intra prediction is performed for blocks with height or width greater than N samples.

6. The method of claim 4, wherein three sets of weights are used.

7. A method, comprising:
predicting a target pixel of a block of video data by applying weights to one or more of a plurality of decoded samples from one or more rows or columns neighboring the block of video data;
computing at least one intra prediction for the target pixel of the luminance block of video data as a function of predictions from one or more of the weighted predictions; and,
decoding the block of video using the prediction, wherein an index corresponding to a set of weights is assigned to sets of weights for applying said weights to a set of reference lines for all intra modes, and wherein sets of weights are assigned on a per block basis for luminance, and wherein chrominance uses a fixed set of weights for all blocks, and wherein reference lines used with a set of weights comprise reference lines not immediately adjacent to the block of video data.

8. The method of claim 7, wherein prediction of chroma components corresponds to luma prediction.

9. The method of claim 7, wherein the index is coded using unary truncated coding.

10. The method of claim 7, wherein said weights are applied for luminance components only.

11. The method of claim 7, wherein three sets of weights are used.

12. An apparatus, comprising:
a processor, configured to perform:
predicting a target pixel of a block of video data by applying weights to one or more of a plurality of decoded samples from one or more rows or columns neighboring the block of video data;
computing at least one intra prediction for the target pixel of the luminance block of video data as a function of predictions from one or more of the weighted predictions; and,
decoding the block of video using the prediction, wherein an index corresponding to a set of weights is assigned to sets of weights for applying said weights to a set of reference lines for all intra modes, and wherein sets of weights are assigned on a per block basis for luminance, and wherein chrominance uses a fixed set of weights for all blocks, and wherein reference lines used with a set of weights comprise reference lines not immediately adjacent to the block of video data.

13. The apparatus of claim 12, wherein three sets of weights are used.

14. The apparatus of claim 12, wherein said weights are applied for luminance components only.

15. The apparatus of claim 12, wherein the index is coded using unary truncated coding.

16. The apparatus of claim 12, wherein prediction of chroma components corresponds to luma prediction.

17. The apparatus of claim 12, wherein multiple reference intra prediction is performed for blocks with height or width greater than N samples.

18. A device comprising:
an apparatus according to claim 12; and
at least one of (i) an antenna configured to receive a signal, the signal including the video block, (ii) a band limiter configured to limit the received signal to a band of frequencies that includes the video block, and (iii) a display configured to display an output representative of a video block.

19. A non-transitory computer readable medium containing data content generated according to the method of claim 1, for playback using a processor.

20. A non-transitory computer readable medium comprising instructions which, when the program is executed by a computer, cause the computer to carry out the method of claim 7.

* * * * *